Nov. 25, 1958     B. L. LATTNER ET AL     2,861,503
COMPOUND SLIDE MILLING ATTACHMENT

Filed Feb. 23, 1955     3 Sheets-Sheet 1

INVENTORS,
Carl R. Chafy.
Bernie L. Lattner.
Attorney.

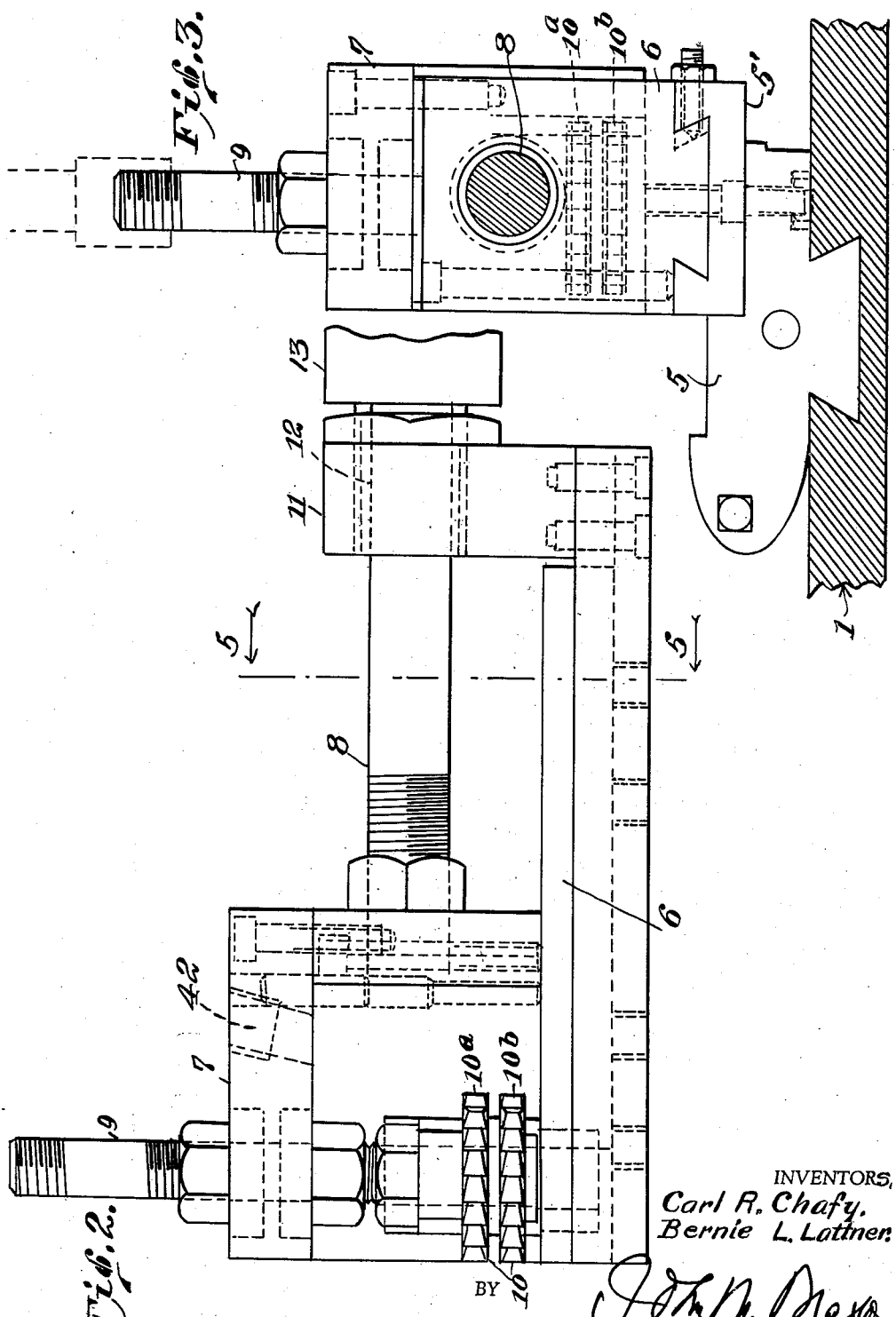

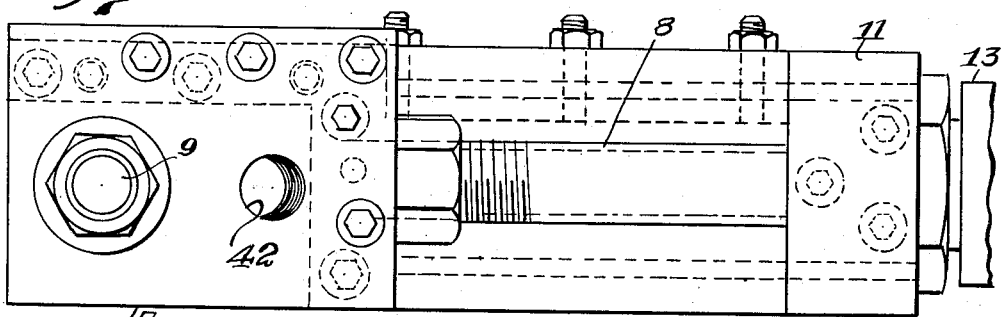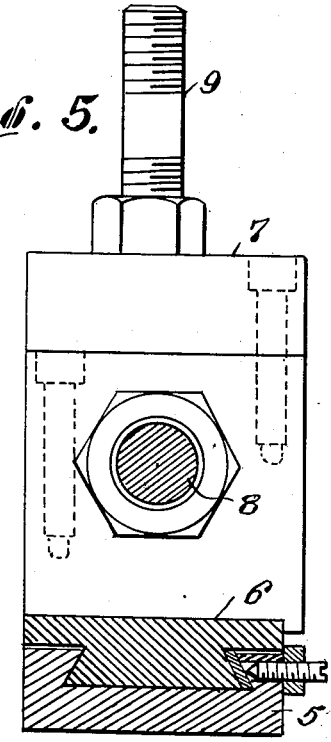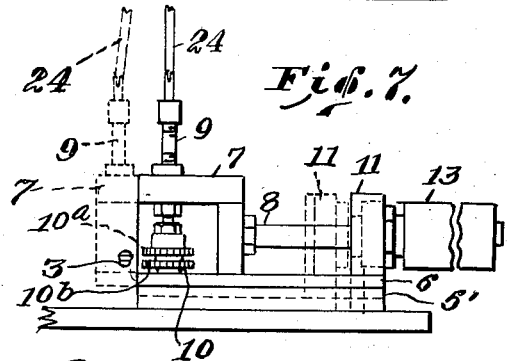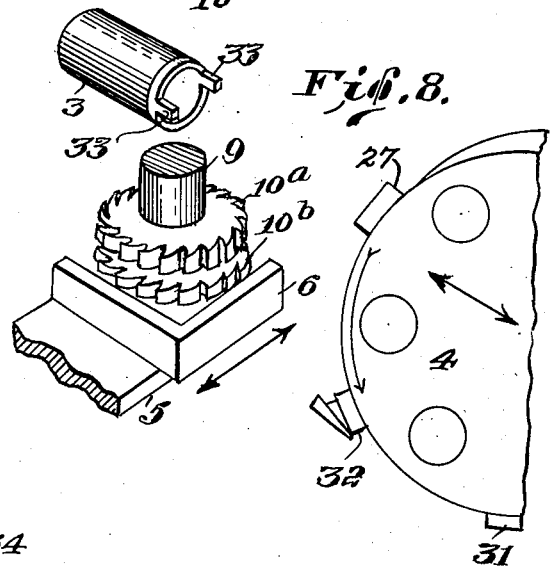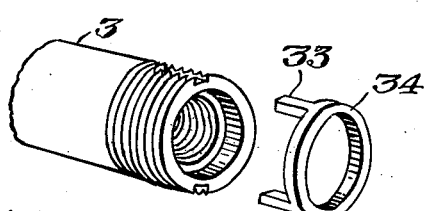

United States Patent Office 2,861,503
Patented Nov. 25, 1958

2,861,503

COMPOUND SLIDE MILLING ATTACHMENT

Bernie L. Lattner, Ferndale, and Carl R. Chafy, Royal Oak, Mich., assignors to Lattner Bros. Machine Co., Ferndale, Mich., a partnership Application February 23, 1955, Serial No. 489,904

7 Claims. (Cl. 90—15)

The present invention relates to an improved machine for making lock washers or similar bodies, and more particularly to an attachment to be mounted on and operating in conjunction with a conventional screw machine.

A principal object of this invention is to make lock washers of the type used in locking externally threaded bushings in threaded openings, each washer comprising a ring having two diametrically disposed parallel legs extending from one side face of the ring.

A further object of this invention is to make lock washers of the type described, or similar bodies, with such rapidity as to materially decrease the cost of such bodies.

A still further object of this invention is to provide a machine attachment that may be operated from the main shaft of the machine or any other suitable source of power.

A still further object of this invention is to provide an attachment which may be readily mounted on the cross slide of a conventional screw machine.

Another object of the invention is to provide an attachment for a machine with two slides, one of which may slide with and also independently of the other.

Other objects will appear hereinafter throughout the specification.

Referring to the drawings:

Figure 2 is a side elevation of the cutter used to form the legs on the washers, and a part of the mechanism employed to move the cutter to cutting position.

Figure 3 is an end view of the mechanism shown in Figure 2.

Figure 4 is a top plan view of the mechanism shown in Figure 2.

Figure 5 is a sectional detail through the slide connection between the attachment and the cross slide of a screw machine.

Figure 7 is a view in detail of the universal connection between the arbor of the cutter and its driving shaft.

Figure 8 is a perspective view showing the relative positions of the turret, the cutter, and the stock just prior to making the final cut of the washer from the stock.

Figure 9 is a detail view in perspective showing the relationship of one of the washers made by the attachment of this invention just prior to the engagement of its legs in corresponding slots in a threaded bushing to lock said bushing in a threaded opening.

Figure 12:
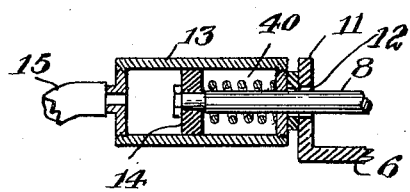

Figure 12 is a sectional view showing the piston 14 in the cylinder 13 and the spring 40 used to retract the piston when the solenoid valve closes.

Referring to the figures of the drawing, 1 represents the body of a screw machine which at one end carries a stock support 2 for supporting one end of the stock 3. This stock may be rotated and advanced toward a turret 4 mounted centrally of the machine by any suitable mechanism (not shown). The turret 4 is moved sixty degrees at a time to successively bring the various tools carried thereby into a position in alignment with the end of the stock as will be described in detail hereinafter.

A cross slide 5 is mounted on the top of the machine to reciprocate in a direction at right angles to the axis of the stock and includes a guide 5' secured thereto. A second slide 6 is mounted on the cross slide 5, and is arranged to slide in the same direction as the slide 5 and in a parallel plane. Projecting upwardly from the end of the slide 6 adjacent the turret is a housing 7 which supports one end of a horizontally disposed piston rod 8 and also the arbor 9 of the rotary cutter 10. Similarly disposed on the opposite end of the slide 5 is a standard 11 provided with an opening 12 through which the piston rod 8 slides as the cutter 10 moves to and from the stock.

The actuating mechanism for the upper slide 6 comprises a cylinder 13 secured at one end to one side of the standard 11 and a piston 14 in the cylinder and connected to the piston rod 8.

Figure 11:
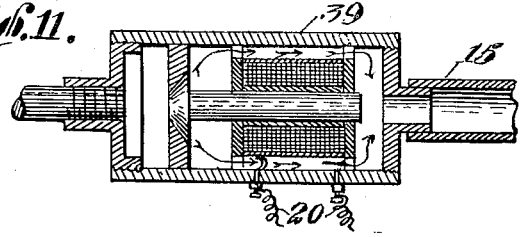
Figure 11 is a sectional view through the solenoid valve used to control flow of air to the motor which operates the upper slide.

Compressed air to actuate the piston 14 is supplied to the cylinder by a flexible hose 15 which extends from the cylinder 13 to an air cylinder 16 on the frame 1, and through which air is conducted to actuate the piston 14 and in turn the slide 6 to cause the cutter 10 to move into engagement with the stock. Any suitable electrically operated valve mechanism, such as a solenoid valve of the type shown in Figure 11, may be used to control the flow of air to the cylinder 13. Such valve mechanism may be actuated by a cam 17 on the rotary shaft 18, such cam being arranged to actuate a switch 19 electrically connected to the valve mechanism by the lines 20, which may receive their current from any suitable source, as indicated at 21 in Figure 1.

The means used to actuate the rotary cutter 10 comprises a motor 22 mounted on a suitable support 23 above the machine. The driving connection between the motor and the cutter comprises the shaft 24 which is connected at one end by any suitable universal joint 26 to the motor 22, and at its other end by a similar joint to the upper end of the cutter arbor 9. The last-mentioned joint is also provided with a slip connection to provide some axial play between the arbor 9 and the shaft 24 to take care of the back and forth lateral movement of the lower end of the shaft as the cutter and its slide move to and from the stock in the normal operation of the device.

The turret 4 and the tools carried thereby may be operated from any suitable power source as, for example, the main shaft 18 of the machine.

Figure 10:
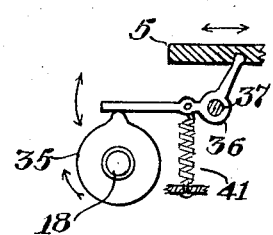
Figure 10 is a side view of the means used for operating the lower cross slide of the attachment from the main shaft of the machine.

The cross slide 5 is shown as being operated in one direction by a cam 35 on the shaft 18 through the pivoted lever 36. This lever is pivoted between its ends at 37 and its upper leg passes through a slot 38 in the frame and engages in a recess in the underside of the slide 5. When the cam 35 strikes the lower side of the lower leg of the lever, as it is rotated in a counterclockwise direction, the slide 5 will be moved inwardly toward the stock, and any suitable means as, for example, a spring 41 shown in Figure 10, may be used to return the slide to its original position. The other cam 17 on the shaft 18 operates to close the switch 19 which in turn operates the solenoid valve 39.

It will be understood that various other means to transmit movement from the shaft 18 to the lower slide may be used. The specific arrangement of the cams on the shaft, and the form of the valve and the switch shown are illustrative only.

It is also to be understood that the specific arrangement of the cams on the shaft and their relationship to the switch and to the lever 36 may be adjusted to bring about the proper synchronization of movement of the two slides in the operation of the attachment. The movement of the slides must be so synchronized that for each operation the slide 5 starts to move toward the stock before the slide 6 starts to move on slide 5. This movement of the slide 5 continues until the cutter is brought into a position adjacent the stock at which time the switch 19 is closed by the cam 39, causing actuation of the piston 14 to move the slide 6 at a much faster rate than the slide 5 to bring the cutter into engagement with the stock to perform its cutting operation. As the cam 17 releases the switch, the slide 6 will be backed off from the stock by any suitable means as, for example, a spring 40 which may be positioned between the inner end of the cylinder 13 and the piston 14, as shown in Figure 12. This operation is repeated with each rotation of the shaft 18.

The turret 4 and the tools carried thereby are more or less conventional, and may be operated from any suitable source of power as the main shaft of the machine.

In order to flush away shavings and other debris from the cutter during its operation on the work, the housing 7 is provided with an opening 42 in its top wall through which oil fed from a pipe 42' may be supplied.

While the invention is shown as mounted on a screw machine, it is to be understood that it may be used with any other suitable form of machine and that any suitable source of power may be utilized.

The operation

Figure 1:
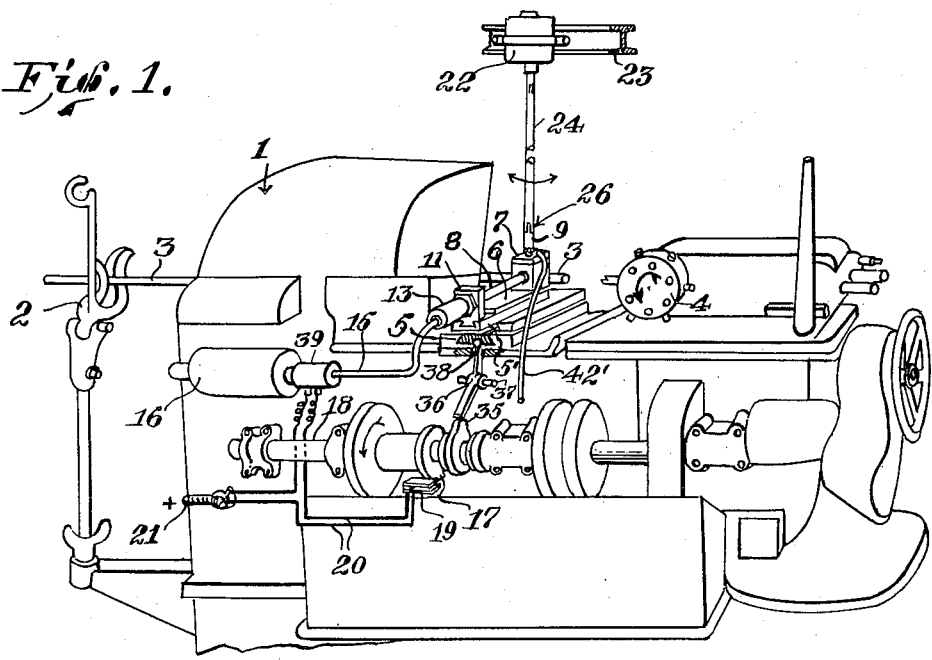
Figure 1 is a perspective view of the attachment of this invention mounted on a conventional screw machine.
Figure 6:
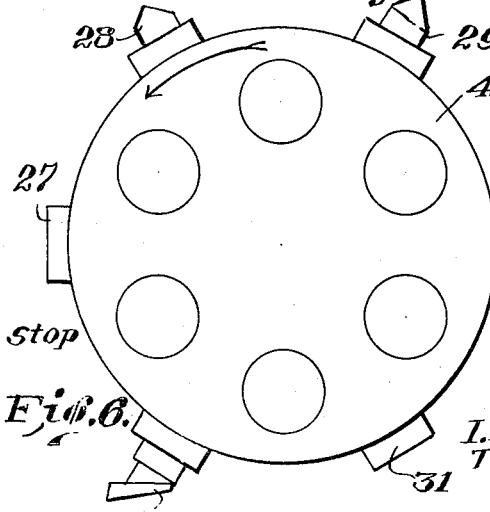
Figure 6 is a side elevation of the turret on the screw machine, showing how the various toools are arranged thereon.

The stock 3 is rotated and continuously fed to the right, as viewed in Figure 1, into engagement with the stop 27 on the turret. This turret has six stations disposed sixty degrees apart and may be operated from the main shaft of the machine or any other power source. Any one of these stations may be brought into alignment with the end of the stock so that any one of the tools carried by the turret may perform its function on the stock. In the sequence of operations on the stock, the stock is first brought into engagement with the stop 27, after which the center drill at station 28 is brought into a position in alignment with the stock by a counterclockwise movement of the turret of sixty degrees.

After the center drill performs its operation, the turret is again rotated to bring the longer drill at 29 into alignment with the stock. When the stock has been drilled by the drill 29 to a depth to provide a tubular portion on the end of the stock long enough to provide one or more lock washers, the turret is rotated to station 30 where the operation of cutting out the wall of the stock to form the legs 33 of the washer 34 is made, as shown in Figure 8. This cutting operation is performed by the cutter 10 which moves in a direction at right angles to the stock, and comprises the two spaced rotary cutting elements 10a and 10b mounted on the arbor 9. As these cutting elements advance through the tubular portion formed on the end of the stock by the longer drill 29, they cut away all of the material of the tubular portion required to make a single washer, with the exception of the parallel legs which extend from the same face of the washer portion proper. The legs have a width equal to the distance between the cutting elements. After this operation, the cutter is backed off to leave the actually extending legs 33 projecting from the body of the stock, as shown in Figure 8.

The turret is once more advanced through an angle of sixty degrees to bring a reaming or turning tool into position to smooth down the interior surface of the washer. After this operation, the turret is again advanced to bring station 32 into position, so that a cutter carried thereby may sever the washer from the stock, as indicated at "cut line" in Figure 8. The washer then falls by gravity to a suitable chute or container where it may be further smoothed by an abrasive powder or similar means.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

Having thus described our invention, we claim:

1. A machine having a frame, a reciprocatory slide secured to said frame, means to actuate said slide, a tool-carrying turret rotatably mounted on said frame adjacent said slide, said turret being rotatable on an axis parallel to the direction of movement of said slide, a second reciprocatory slide secured to said first slide and movable in the same direction, a supporting means fixed to said first slide, a support fixed to said second slide in spaced relation to said supporting means, an arbor rotatably mounted on said support and projecting outwardly therefrom, a plurality of axially spaced cutting means secured on said arbor adjacent its inner end, means connected to said projecting end of said arbor to impart rotary movement to said arbor and said cutting means, automatic means carried by said supporting means and operatively connected to said support on said second slide to move it with respect to said first slide, said last-mentioned means comprising a fluid chamber carried by said supporting means, a fluid pressure responsive member in said chamber, a rod connected at one end to said pressure responsive member and at its other end to said support, a second fluid chamber carried by said frame, a pipe connecting said chambers so that fluid in said second chamber may be conducted to said first chamber to actuate said fluid pressure responsive member to move said second slide away from said supporting means, and automatic means to return said second slide to its original position.

2. A machine having a frame, a reciprocatory slide secured to said frame, means to actuate said slide, a tool-carrying turret rotatably mounted on said frame adjacent to said slide, said turret being rotatable on an axis parallel to the direction of movement of said slide, a second reciprocatory slide secured to said first slide and movable in the same direction, a standard fixed to said first slide, a support secured to said second slide in spaced relation to said standard, an arbor rotatably mounted on said support, said arbor projecting outwardly from said support, two axially spaced cutting elements secured on said arbor adjacent its inner end, flexible shaft means connected to said projecting end of said arbor to impart rotary movement to said arbor and said cutting elements, means to move said second slide with respect to said first slide, comprising a cylinder secured to said standard, a piston in said cylinder, and a piston rod connected to said piston at one end and to the support at its other end, a second cylinder carried by said frame, a flexible pipe connecting said cylinders so that compressed air in said second cylinder may be conducted to said first cylinder to actuate said piston to move said second slide in a direction away from said standard, and means to return said second slide to its original position.

3. In an attachment for a machine, a reciprocatory slide adapted to be mounted on and to slide across a surface of said machine, a second reciprocatory slide movably secured to the first slide and axially movable in the same direction as said first slide, a standard secured on said first slide, a support mounted on and secured adjacent to the end of the second slide in spaced relation to said standard, an arbor rotatably mounted on said support, said arbor projecting outwardly from said support, axially spaced rotary cutting elements secured on said arbor adjacent its inner end, means connected to said projecting end of said arbor to impart rotary movement to said arbor and in turn to said cutting elements and automatic means supported on said standard and directly connected to said support to move said second slide with respect to said first slide said last-mentioned means comprising a fluid pressure chamber rigidly secured to said first slide, a fluid pressure responsive means in said chamber, a rod connected at one end to said fluid pressure responsive means and to said support at its other end, a second fluid pressure chamber adapted to be connected to said machine, a pipe connecting said chambers so that fluid under pressure in said second chamber may be conducted to said first chamber to actuate said fluid pressure responsive means and thus move said second slide and said support away from said standard.

4. In an attachment for a screw machine, a reciprocatory slide adapted to be mounted on and to slide across a surface of a screw machine, a second reciprocatory slide movably secured to the first slide and movable in the same direction as said first slide, a standard secured on said first slide, a support mounted on and secured to the end of the second slide in spaced relation to said standard, an arbor rotatably mounted on said support, said arbor projecting outwardly from said support, two axially spaced rotary cutting elements secured on said arbor adjacent its inner end, means connected to said projecting end of said arbor to impart rotary movement to said arbor and in turn to said cutting elements, means to move said second slide with respect to said first slide comprising a cylinder secured to said first slide, a piston in said cylinder, a piston rod connected to said piston at one end, and being connected to said support, a second cylinder adapted to be connected to said screw machine, a flexible pipe connecting said cylinders so that compressed air in said second cylinder may be conducted to said first cylinder to actuate said piston and thus move said second slide and said support in a direction away from said standard.

5. In an attachment for a machine, a reciprocatory slide adapted to be mounted on and to slide across a surface of a screw machine, a second reciprocatory slide movably secured to the first slide and movable in the same direction as said first slide, a standard secured on said first slide, a support mounted on and secured to the end of the second slide in spaced relation to said standard, an arbor rotatably mounted on said support, said arbor projecting outwardly from said support, two axially spaced rotary cutting elements secured on said arbor adjacent its inner end, means connected to said projecting end of said arbor to impart rotary movement to said arbor and in turn to said cutting elements, means to move said second slide with respect to said first slide comprising a cylinder secured to said first slide, a piston in said cylinder, a piston rod connected to said piston at one end, and being connected to said support, a second cylinder adapted to be connected to said screw machine, a flexible pipe connecting said cylinders so that compressed air in said second cylinder may be conducted to said first cylinder to actuate said piston and thus move said second slide and said support in a direction away from said standard, means to return said piston to its original position, means to control flow of air between the cylinders, and means to actuate said last-mentioned means.

6. In an attachment for a screw machine, a reciprocatory slide adapted to be mounted on and to slide across a surface of a screw machine, a second reciprocatory slide movably secured to the first slide and movable in the same direction as said first slide, a standard secured on said first slide, a support mounted on and secured to the end of the second slide in spaced relation to said standard, an arbor rotatably mounted on said support, said arbor projecting outwardly from said support, a flexible shaft connected to said arbor and means for rotating said shaft, two axially spaced rotary cutting elements secured on said arbor adjacent its inner end, means connected to said projecting end of said arbor to impart rotary movement to said arbor and in turn to said cutting elements, means to move said second slide with respect to said first slide comprising a cylinder secured to said first slide, a piston in said cylinder, a piston rod connected to said piston at one end, and being connected to said support, a second cylinder adapted to be connected to said screw machine, a flexible pipe connecting said cylinders so that compressed air in said second cylinder may be conducted to said first cylinder to actuate said piston and thus move said second slide and said support in a direction away from said standard, means to return said piston to its original position, means to control flow of air between the cylinders, and means to actuate said last-mentioned means.

7. In an attachment for a screw machine, a cross slide adapted to be mounted on and to slide in a horizontal direction across a horizontal surface of a screw machine, a second slide movably secured to the first slide and movable in the same direction as said first slide, a standard secured adjacent one end of said first slide, a housing mounted on and secured to the end of the second slide remote from said standard, a vertically disposed arbor extending through said housing and turnably mounted therein, said arbor projecting at its upper end above said housing, two spaced rotary cutting elements secured on said arbor adjacent its lower end, means connected to said projecting end of said arbor to impart rotary movement to said arbor and in turn to said cutting elements, means to move said second slide with respect to said first slide comprising a cylinder secured to said standard on its side remote from said housing, a piston in said cylinder, a piston rod connected to said piston at one end, extending through said standard, and being rigidly connected to said housing, a second cylinder adapted to be connected to said screw machine, a flexible hose connecting said cylinders so that air in said second cylinder may be conducted to said first cylinder to actuate said piston and thus move said second slide and housing in a direction away from said standard, means to return said piston to its original position, valve means to control flow of air between the cylinders, and means to actuate said valve means.

References Cited in the file of this patent

UNITED STATES PATENTS

| | | |
|---|---|---|
| 1,108,735 | Frykman | Aug. 25, 1914 |
| 1,488,806 | Church | Apr. 1, 1926 |
| 2,364,977 | Hendel | Dec. 12, 1944 |
| 2,453,315 | Harbison | Nov. 9, 1948 |
| 2,569,526 | Johnson | Oct. 2, 1951 |
| 2,584,629 | Smith | Feb. 5, 1952 |
| 2,586,183 | Stewart | Feb. 19, 1952 |
| 2,677,169 | Cybulski | May 4, 1954 |

FOREIGN PATENTS

| | | |
|---|---|---|
| 696,777 | Great Britain | Sept. 9, 1953 |